March 18, 1947.  R. B. IMMEL  2,417,758
SHOCKPROOF ELECTROMAGNETIC DEVICE
Filed Nov. 24, 1943  3 Sheets-Sheet 1

WITNESSES:
Wm. B. Sellers.

INVENTOR
Ralph B. Immel.
BY
Paul E. Friedemann
ATTORNEY

March 18, 1947.  R. B. IMMEL  2,417,758
SHOCKPROOF ELECTROMAGNETIC DEVICE
Filed Nov. 24, 1943  3 Sheets-Sheet 2
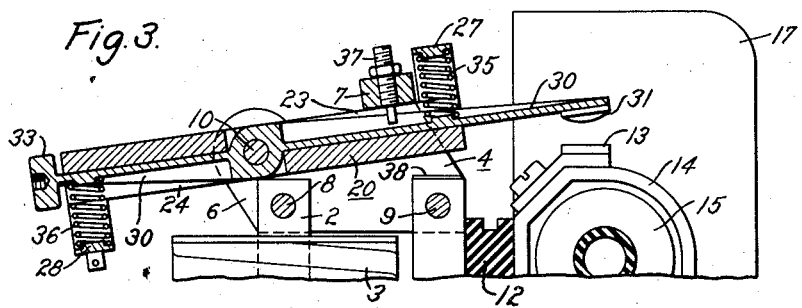
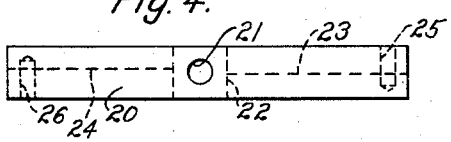
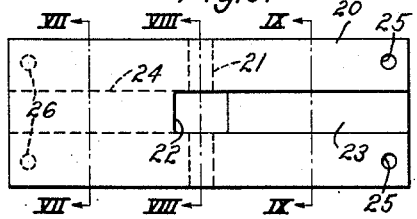 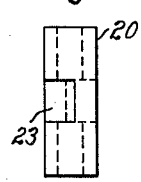 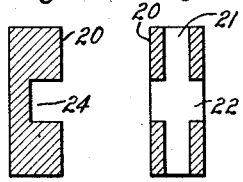 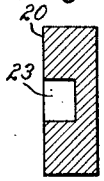
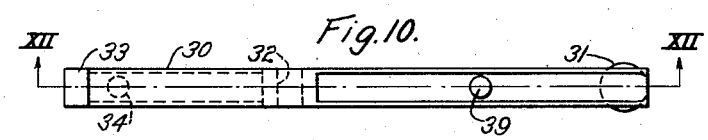
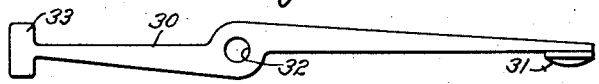
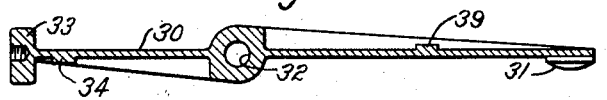
INVENTOR
Ralph B. Immel.
BY
Paul E. Friedemann
ATTORNEY March 18, 1947. R. B. IMMEL 2,417,758
SHOCKPROOF ELECTROMAGNETIC DEVICE
Filed Nov. 24, 1943 3 Sheets-Sheet 3
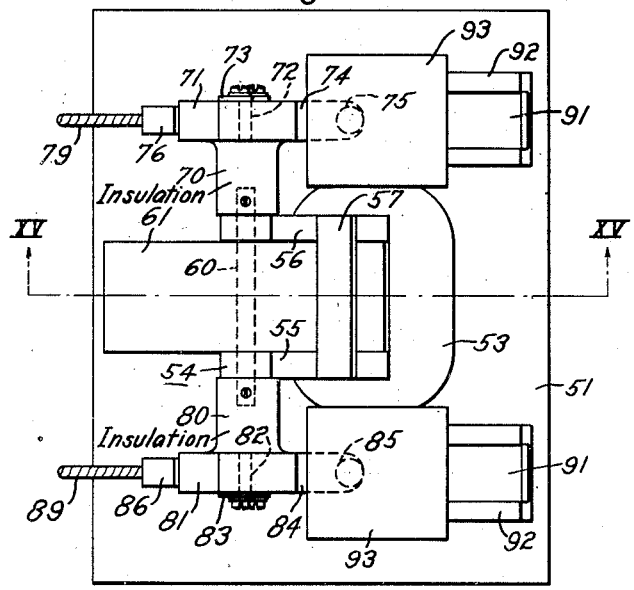
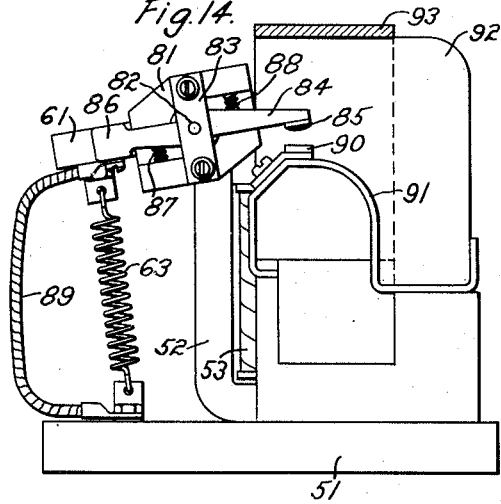
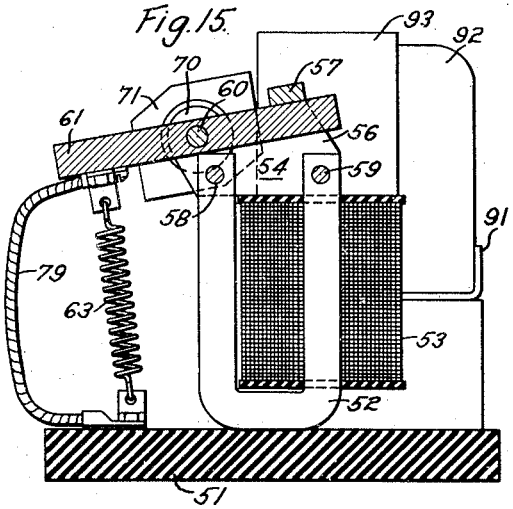
WITNESSES:
INVENTOR
Ralph B. Immel.
BY
ATTORNEY Patented Mar. 18, 1947

2,417,758

UNITED STATES PATENT OFFICE 2,417,758

SHOCKPROOF ELECTROMAGNETIC DEVICE

Ralph B. Immel, Wilkinsburg, Pa., assignor to Westinghouse Electric Corporation, East Pittsburgh, Pa., a corporation of Pennsylvania Application November 24, 1943, Serial No. 511,565

5 Claims. (Cl. 200—87)

My invention relates to shockproof electromagnetic devices, and particularly to contactors which, when subjected to shock, maintain the contact closing or opening position assumed by them previous to the shock.

The need for such devices arises particularly on vehicles or naval vessels. For instance, on naval vessels, the electric contactors, relays and the like control or protective apparatus should maintain their armatures and contact assemblies in the required position regardless of mechanical shock forces and vibrations which may be caused by the operation of internal equipment or concussion with external objects. It is obvious that the unexpected closing or opening of a circuit control device during shock may be dangerous to the personnel or damaging to the equipment controlled by the device. It is often also vital that during an emergency in which a shock is apt to occur, certain machinery of the vessel remains operated or in operative and controllable condition at all times.

It is an object of my invention to provide electric devices and, in particular, electromagnetic contactors, whose movable assembly is sufficiently insensitive to shock forces or vibration to satisfy the above-mentioned requirements.

More specifically, my invention aims at providing a device which affords a shock protected operation by its inherent characteristics rather than by extraneous locking devices.

Another object of my invention is the provision of shockproof contactors and the like electrically operated devices which are insensitive to shocks and vibrations over an extremely wide range of shock and vibration frequencies, or which are virtually independent of the shock frequency, thereby ensuring an increased safety and reliability of protection.

A still further object of the invention consists in providing an electric device of the type here concerned which, while insensitive to shock forces and vibration, permits a control operation, i. e., an intended change of position of its armature assembly during the period of persistence of such forces and vibrations.

In order to achieve these objects, I propose, according to this invention, to design the armature assembly of an electromagnetic device, which assembly is mounted for pivotal and angularly limited motion, as a balanced system whose main component parts are rigid and individually balanced in static and dynamic respects relative to their respective pivot axes.

In one of its more specific aspects, my invention involves a contactor whose movable assembly includes a magnet armature and a contact-controlling member, both consisting of rigid lever-like parts, both pivotally mounted for angular motion about the same pivot axis, and both individually balanced with respect to that axis.

In devices of this kind, any shock force applied to the support and pivot bearing of the armature assembly has no appreciable effect on the angular position of the assembly, and hence does not change the contact or control condition of the contactor.

These and other features of the invention will be explained by the following description of the embodiment illustrated in the drawings in which:

Fig. 3 represents a partial and sectional view, the section being taken along a plane perpendicular to the illustration of Fig. 2 and extending through the horizontal center line of Fig. 2;

Figs. 4, 5 and 6 are lateral, top and front views, respectively, of the magnetic armature which forms one of the main component parts of the movable assembly of the contactor shown in Figs. 1, 2 and 3;

Figs. 7, 8 and 9 are cross-sections through the same magnetic armature taken along the planes denoted in Fig. 5 by the dot-and-dash lines marked VII—VII, VIII—VIII and IX—IX, respectively.

Figs. 10 and 11 are a top view and a side elevation, respectively, of the contact member which represents another main part of the movable assembly of the contactor according to Figs. 1, 2 and 3;

Fig. 12 is a longitudinal section through the same contact member taken along the plane denoted in Fig. 10 by the dot-and-dash line marked XII—XII; while Figs. 13, 14 and 15 represent another contactor according to my invention, showing in Fig. 13 a top view, in Fig. 14 a side elevation, and in Fig. 15 a sectional view taken along the plane denoted in Fig. 13 by the dot-and-dash line marked XV—XV.

Figure 1:
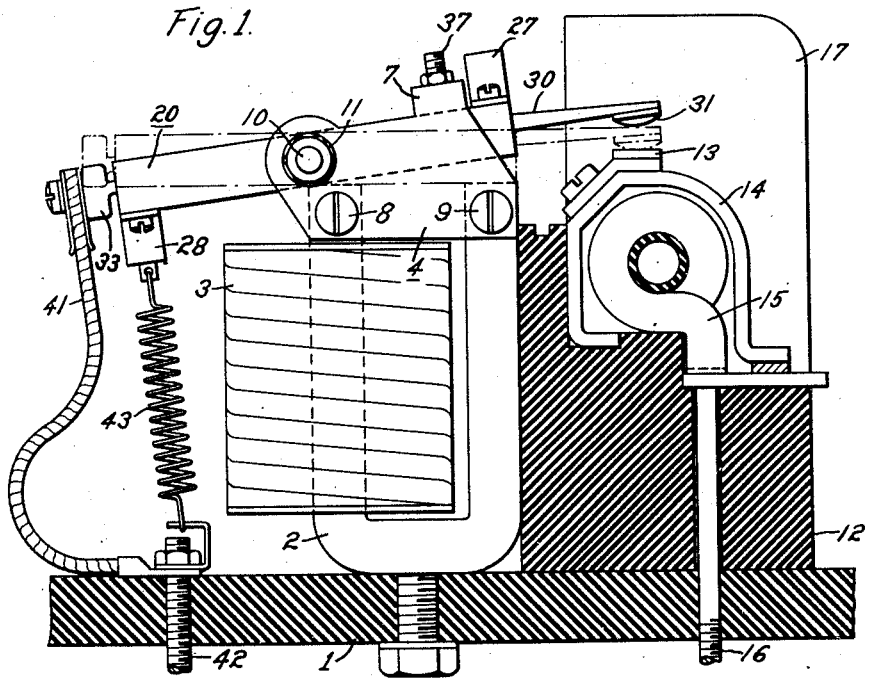
Figure 1 is a part sectional side elevation of an electromagnetic contactor designed in accordance with the invention.
Figure 2:
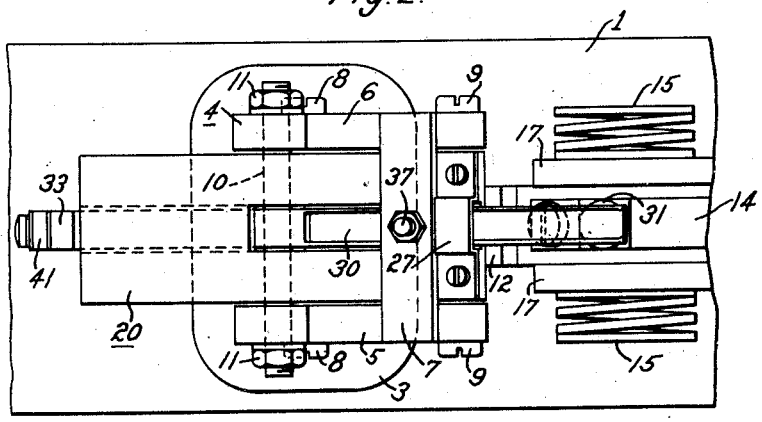
Fig. 2 is a top view of the same contactor.

Referring to Figs. 1, 2 and 3 of the drawings, numeral 1 represents a base, such as panel or wall, on which the component parts of the contactor are mounted. Numeral 2 represents the magnetic frame structure of the contactor. This structure has a substantially U-shaped configuration and is firmly secured to the base 1. One of the legs of the U-shaped frame carries the control coil 3 of the contactor. A bracket member 4 of non-magnetic material, for instance brass, is mounted across the ends of the two legs of the magnetic frame 2. The bracket member 4 has two walls 5 and 6 which extend in parallel to each other and are connected with each other by a portion 7 which serves as a stop for limiting the angular motion of the movable contactor assembly to be described in a later place. The side walls 5 and 6 of the bracket member 4 are secured to the magnetic frame 2 by means of screws 8 and 9. A pivot shaft 10 extends between the two side walls 5 and 6 and is firmly secured thereto by means of screw nuts 11.

An insulating carrier 12 is rigidly attached to the base 1 adjacent to the magnet frame 2 and carries a stationary contact 13 which is mounted on an arc horn 14 and electrically connected in series relation to blowout windings 15, which, in turn, are attached to a connecting stud 16 for supplying electric current to the stationary contact and coil assembly. The contact 13 and the arc horn 14 are arranged between the walls 17 of an arcing chamber, while the blowout coil 15 extends through the bend of the arcing horn 14 and traverses the arcing chamber. In Fig. 1, the wall 17 of the arcing chamber facing the observer is removed in order to reveal the details of the stationary contact assembly.

The movable contactor assembly, for controlling a contact 31 cooperating with the stationary contact 13, includes two main elements, namely, a magnetic armature 20, and a contact member 30 controlled by the armature and provided with the above-mentioned movable contact 31. The armature 20 and the contact member 30 are individually pivoted on the stationary structure of the contactor so as to be capable of limited angular motion. The shaft 10 serves as a pivot bearing for both members 20 and 30, so that they perform their angular motions about the same pivot axis.

As set forth previously, the movable contactor assembly as a whole is designed so as to be substantially balanced in static and dynamic respects relative to the pivot axis. In order to obtain such a balance and in accordance with one of the features of the invention, each of the members 20 and 30 is individually balanced as regards its motion about its pivot axis. How this individual balance is obtained will be understood from the detailed illustrations in Figs. 4 through 12, to which reference is had in the following.

The magnetic armature 20, according to Figs. 4 through 9, consists of a relatively heavy block which has a transverse bore 21 for receiving the pivot shaft 10. The bore 21 passes through the center of the structure so that the armature resembles a lever whose opposite arms extend equal distances away from the fulcrum. The masses located at the two sides of this lever are equal and are equally distributed over the width of the structure, so that the armature is statically and dynamically balanced. As a result, if shock is applied to the pivot bearing, the torques produced thereby on the two lever arms are equal and of opposite direction and thus cancel each other. Still referring to Figs. 4 through 9, it will be seen that the armature block 20 has also an opening 22 which traverses the body from the top to the bottom of the side elevation shown in Fig. 4. Bore 21 and opening 22 merge with each other as is best apparent from the cross-section shown in Fig. 8. Extending from opening 22 towards the right-hand end of the structure and located at the top side in the showing of Fig. 4 is a groove 23 which is also apparent in the cross-section of Fig. 9. Similarly, a groove 24 extends from the opening 22 towards the left-hand end of the structure and is located at the bottom side of the showing in Fig. 4. This groove 24 is also apparent in the cross-section of Fig. 7. The just-mentioned opening 22 and grooves 23 and 24 serve to receive the contact member 30 in the manner best apparent from Fig. 3. The armature body 20 has also threaded bores 25 and 26 for the attachment of saddles 27 and 28 (Figs. 1 and 3) respectively, serving to accommodate two biasing springs 35 and 36, respectively, for holding the contact member 30 in proper position relative to the armature 20.

The contact member 30, according to Fig. 10, is at one end provided with the movable contact 31 and has a center bore 32 to be seated on the pivot shaft 10. The seat is sufficiently loose to permit the contact member 30 an oscillatory motion of the pin independent of the motion of the armature 20. The contact member is designed as a channel-shaped structure in order to render it as rigid as possible. Similar to the above-described armature, the contact member 30 represents a lever whose arms are of equal weight and are balanced in static and dynamic respects. Hence, any shock or vibration imparted to the pivot shaft produces opposite torques on the two lever arms and thus remains ineffective as regards the angular position of the contact member relative to the pivot bearing. In order to obtain the just-mentioned balance with convenient dimensions of the contact lever, a counterpoise 33 integral with the main body of the member is provided. The member has two lugs 34 and 39 located at opposite sides and within a channel formed by the structure. These lugs serve to engage the above-mentioned biasing springs 35 and 36 (Fig. 3), respectively. The contact member consists of an electrically highly conductive material, such as bronze.

Reverting now to Figs. 1, 2 and 3, it will be seen that when the armature block and the channel-shaped contact member 30 are properly assembled, the two levers formed thereby are arranged in crosswise relation (Fig. 3). The saddles 27 and 28 and appertaining biasing springs 35 and 36 tend to hold the contact lever 30 flat against the adjacent surface portions within the grooves 23 and 24 of the armature. The weights or masses of the saddles and springs are equal, and their distances from the pivot or fulcrum at 10 are also equal so that the balance of the whole assembly is substantially not disturbed by their presence.

A cable 41 is attached to the contact member 30, the counterpoise portion 33 serving also for providing the necessary terminal surface. The cable 41 is connected with a stud 42. A return spring 43 is mounted between the saddle 28 and a stationary holder attached to the stud 42 (Fig. 1). This spring 43 biases the movable assembly towards the contact opening position shown in Figs. 1 and 3. In this position, the armature 20 abuts against the stop formed by the cross-portion 7 of the bracket member 4. If desired, an adusting screw 37 may be provided in the stop member 7. However, such a screw is as a rule not necessary for the customary uses of such a relay. A non-magnetic shim 38 (Fig. 3) is placed on the pole surface of the magnetic frame 2 in order to prevent sticking of the armature.

When the relay coil 3 is energized, the armature 20 is attracted by the magnet and moves towards the contact closing position. During the first portion of this movement, the contact member 30 is kept in firm engagement with the armature due to the action of the biasing springs 35 and 36. However, as soon as the movable contact 31 touches the stationary contact 13, the angular motion of the contact member 30 is stopped while the armature 20 is permitted to continue its travel for a limited distance under compression of the springs 35 and 36 until the armature abuts against the shim 38. During this addition or "overtravel" motion of the armature, the increase in compression of springs 35 and 36 produces a corresponding increase in contact pressure between contacts 13 and 31.

By virtue of the fact that the main parts of the movable assembly, i. e., those parts which involve the preponderant weight or mass of the assembly, are balanced, any shock applied to the stationary parts of the contactor, for instance, shocks acting on the base 1 carrying the component parts of the relay, has no effect on the angular position of the movable assembly as a whole, nor is there such an effect on the movable contact member because the latter is balanced individually.

When speaking of a static and dynamic balance, I am aware of the fact that the balance is apt to be imperfect theoretically because of the presence of the return spring 43 and also because of inevitable slight inaccuracies of construction. However, it will be understood from the foregoing description that I impart so much mass and weight to the main parts of the movable assembly that the theoretical departure from a perfect balance become negligible. Besides, when the armature assembly is in the contact-opening position the unbalance effect of the spring 43 is only slight, and when the armature assembly is attracted by the magnet coil 3, the force produced by the latter compensates part of the balance inequality introduced by the spring 43. It is also possible to arrange the return spring in two symmetrically and oppositely located places, and also to arrange the flexible cable 41 in a similar way or to provide a movable contact bridge between two stationary contacts which eliminates the necessity of using a flexible supply cable. This would reduce or eliminate the just - mentioned imperfection. However, I have ascertained by tests that the relay as described in the foregoing is sufficiently balanced to prevent unintentional operation of the contacts due to the occurrence of heavy shocks.

In these tests, a contactor designed in accordance with the above-described embodiment was subjected to impact shocks produced by applying 2000-pound blows upon the back, top and sides of the stationary parts of the contactor. Due to the sturdy and rigid construction of the movable assembly and its component parts, the contactor withstood these blows without showing damage to any of its parts. The blows applied from the top and the sides had no effect on the contactor operation. That is, when the contactor was opened before applying shock, it remained in the contact opening condition during the persistence of the shock, and when it was closed before the shock, the contacts remained closed and no angular motion of either the contact member or the armature was noticeable. When applying the shocks from the back, the contacts remained also closed, although a slight tendency of the armature to perform angular motion could be observed when the switch was closed and the attractive force of the magnet at a low value. This motion was at most only a small fraction of the above-mentioned overtravel motion, and hence not detrimental to the intended function. This slight tendency to move was probably due to the slight unbalance explained in the foregoing and could easily be prevented by increasing the holding force of the magnet coil.

It will be understood from the foregoing description that while a contactor according to the invention is insensitive to shocks as regards its contact operation, it does not prevent at any time an intentional operation of the contacts. In this respect, a shockproof contactor according to the invention is favorably distinguished from devices which contain shock-responsive locking devices, and hence prevent not only the undesired movements, but also any intended operation during the persistence of shocks or heavy vibrations.

The illustrated embodiment of my invention has also the advantage that the movable contactor is inherently safe-guarded against lateral, rolling or wiping movements relative to the stationary contact 13 during the overtravel period of the relay operation. In known relays, whose movable contact member is capable of a spring biased angular motion relative to the armature, the movable contact is caused to move angularly relative to the stationary contact or to perform a relative sliding motion due to the above-described over-travel motion of the armature. When silver or alloy contacts of high conductivity are employed, this relative motion, occurring after the electric contact has been initiated, but before the final contact pressure is effective, promotes the transfer of contact material from one to the other contact depending upon the direction of the current flow. The relative contact motion during the overtravel period may also be the cause of sparks which are likewise detrimental to the silver or alloy surfaces. Due to the fact that in a contactor as described in the foregoing the pivot axis of the movable contact member is identical with that of the armature, and also by virtue of the rigidity of construction, any wiping or rolling motion between the movable contact 31 and the stationary contact 13 is positively excluded without requiring supplemental constructive elements or devices for obtaining this favorable result.

The embodiment illustrated in Figs. 13, 14 and 15 is a two-pole relay contactor which, though differently designed, embodies also the principles of my invention set forth in the foregoing.

According to Figs. 13 to 15, an insulating base 51 carries a magnetic frame 52 of U-shape configuration. One leg of the frame is provided with the relay coil 53. A bracket member denoted as a whole by numeral 54 is firmly secured to the ends of the U-shaped frame 52 by means of pins or screws 58 and 59. The bracket 54 has two parallel leg portions 55 and 56 and forms a cross-bar 57 which bridges the leg portions 55 and 56 and forms a stop for limiting the angular motion of the relay armature away from the magnet coil.

A shaft 60 is journaled in the leg portions of the bracket and serves as the pivot axis for the magnetic armature 61. This armature consists of a bar of rectangular shape whose bore for the passage of shaft 60 is located exactly in its center, so that the armature is statically and dynamically balanced with respect to shaft 60.

The two ends of shaft 60 extend beyond the leg portions 55 and 56 and carry two insulating holders 70 and 80, respectively. These holders are firmly secured to the shaft so as to participate in the angular motion of the armature. Each holder has a radially projecting portion 71 or 81 each serving to accommodate a movable contact assembly. To this end, a pivot pin 72 or 82 is mounted on each holder 71 or 81 by means of a bearing plate 73 or 83. A movable contact lever 74 or 84 is pivotally mounted on the appertaining pivot pin 72 or 82 and carries a contact 75 or 85. Each contact lever has an enlarged portion 76 or 86 at its end opposite the corresponding movable contact, so that the mass of each movable contact assembly is balanced with respect to its pivot pin. Two springs, such as those denoted by 87 and 88, are provided in each insulating holder for biasing the movable contact assembly towards stop surfaces formed by the insulating holder, as will be seen from the illustration in Fig. 14. Each holder with its pivot plate and springs is balanced about the axis of rotation, so that the entire rotatable armature and contact assembly is statically and dynamically balanced.

The movable contacts 75 and 85 cooperate with stationary contacts, such as contact 90 in Fig. 14, which are mounted on arc horns 91 and arranged in arc chambers 92. The arc chambers are held in position by metal straps 93. Blowout coils (not illustrated) may be provided in a manner similar to the corresponding arrangement of coils shown in Figs. 1 and 2. A spring 63 extending between the base 51 and the armature 61 tends to maintain the armature and contact assembly in the contact opening position illustrated in Fig. 14. Flexible connections 79 and 89 serve to supply electric current to the two movable contact members.

By virtue of the static and dynamic balance of the double-pole armature and contact assembly, the shock forces which might be transmitted from the base of the relay through the magnetic frame 52 and the bracket 54 to the pivot shaft 60 of the movable assembly have virtually no tendency to rotate the assembly about its pivot, because these forces are substantially balanced as to their momentum on the assembly. The embodiment has the further advantage of an extremely simple design of its magnetic armature and other parts of the movable relay assembly, so that its manufacture and assemblage are simplified to a considerable extent.

While I have described my invention in two characteristic embodiments, it will be obvious to those skilled in the art upon a study of this specification that it can be applied in a similar manner to other types of contactors or other electric and electromagnetic devices in which an angularly movable assembly is to be protected from uncontrolled operation due to shock or vibration. In view of the possibility of such modifications, I wish this specification to be understood as illustrative and not in a limiting sense.

I claim as my invention:

1. A shockproof contactor, comprising an electromagnet, a stationary contact, an assembly including a movable contact and being movable between two positions to respectively open and close said contacts, said assembly being biased toward one of said positions and operable by said magnet to move to said other position and comprising a substantially rigid armature member to be attracted by said magnet and a substantially rigid contact member carrying said movable contact, said two members being pivotally mounted for angular motion and having the same single geometrical pivot axis and being individually substantially balanced in static and dynamic respects relative to said axis, and spring means forming part of said assembly for biasing said two members toward a given position relative to each other so as to permit relative motion between said members when said assembly moves into contact closing position.

2. A shockproof contactor, comprising an electromagnet, a stationary contact, an assembly including a movable contact and being movable between two positions to respectively open and close said contacts, said assembly being biased toward one of said positions and operable by said magnet to move to said other position and comprising a substantially rigid armature member to be attracted by said magnet and a substantially rigid contact member carrying said movable contact, said two members being pivotally mounted for limited angular motion relative to each other about a common single geometrical pivot axis and being individually substantially balanced in dynamic and static respects relative to said axis, and contact pressure springs forming part of said assembly for biasing said two members toward a given relative position and being arranged at opposite sides of said axis so that said assembly as a whole is substantially balanced about said axis.

3. A shockproof contactor, comprising an electromagnet, a stationary contact, an assembly having an armature member to cooperate with said magnet and a contact member to cooperate with said stationary contact, said contact member being linked with said armature member to be entrained thereby when said armature member is attracted by said magnet, each of said two members having substantially the shape of an elongated bar, and both said members having a single common fulcrum bearing for limited angular motion relative to said magnet and being arranged so that their respective longitudinal axes intersect each other on the axis of said fulcrum bearing in all positions of said members relative to each other, each of said members being substantially balanced so as to be non-responsive to shocks acting on said bearing, and spring means for biasing said members toward a given angular position relative to each other so that they move in unison when said contact member is disengaged from said stationary contact.

4. A shockproof contact device, comprising a stationary structure including an electromagnet and contact means to be controlled by said magnet, a rigid armature member operable by said magnet and pivoted to said structure for limited angular motion, said armature member having an opening at the center of its pivot axis, a rigid member disposed for controlling said contact means and extending through said opening, said latter member being pivoted for limited angular motion about said pivot axis of said armature member, said two members being individually substantially balanced relative to said pivot axis, and spring means for biasing said control member toward a given position relative to said armature member.

5. A shockproof contact device, comprising an electromagnetic device comprising an electromagnet, an elongated and rigid plate-shaped armature adjacent to and operable by said magnet and having a pivot along its transversal center line for limited angular motion relative to said magnet, said armature having an opening in its center portion and two grooves extending from said opening toward the two opposite ends respectively of the armature and located on the side of the armature facing said magnet and the opposite armature side respectively, a rigid contact lever fulcrumed about said center line and extending through said opening and said two grooves so as to be capable of limited angular motion relative to said armature, said armature and said contact lever being each statically and dynamically balanced so that their angular position is unaffected by shocks acting on said pivot, spring means for biasing said contact lever toward a given position relative to said armature, and a stationary contact disposed in the path of said contact lever to be engaged thereby, under pressure due to the bias of said spring means, when said armature approaches one of the limits of its angular motion.

RALPH B. IMMEL.

REFERENCES CITED

The following references are of record in the file of this patent:

UNITED STATES PATENTS

| Number | Name | Date |
|---|---|---|
| 2,165,037 | Ellis | July 4, 1939 |
| 1,886,372 | Bossart | Nov. 8, 1932 |
| 1,741,409 | Dunn | Dec. 31, 1929 |
| 2,398,681 | Weber | Apr. 16, 1946 |